(12) United States Patent
Furutani et al.

(10) Patent No.: US 11,107,252 B2
(45) Date of Patent: Aug. 31, 2021

(54) IMAGE DECODING DEVICE FOR EXPANDING A PARTIAL IMAGE FROM AN ENTIRE IMAGE

(71) Applicant: SHIKINO HIGH-TECH CO., LTD., Jozu (JP)

(72) Inventors: Koichi Furutani, Osaka (JP); Keisuke Saito, Osaka (JP)

(73) Assignee: SHIKINO HIGH-TECH CO., LTD., Uozu (JP)

( * ) Notice: Subject to any disclaimer, the term of this patent is extended or adjusted under 35 U.S.C. 154(b) by 120 days.

(21) Appl. No.: 16/487,459

(22) PCT Filed: Jan. 10, 2018

(86) PCT No.: PCT/JP2018/000259
§ 371 (c)(1),
(2) Date: Aug. 21, 2019

(87) PCT Pub. No.: WO2018/154982
PCT Pub. Date: Aug. 30, 2018

(65) Prior Publication Data
US 2019/0378308 A1    Dec. 12, 2019

(30) Foreign Application Priority Data
Feb. 23, 2017 (JP) ............................. JP2017-031718

(51) Int. Cl.
*G06K 9/00* (2006.01)
*G06T 9/00* (2006.01)
*H04N 19/42* (2014.01)

(52) U.S. Cl.
CPC ............. *G06T 9/005* (2013.01); *H04N 19/42* (2014.11)

(58) Field of Classification Search
CPC ........ H04N 7/26106; H04N 7/50; H04N 7/30; H04N 7/3022; H04N 7/5013;
(Continued)

(56) References Cited

U.S. PATENT DOCUMENTS 5,450,209 A * 9/1995 Niimura .................. H04N 9/804
386/329
5,565,992 A * 10/1996 Enari .................... H04N 19/126
358/426.12
(Continued)

FOREIGN PATENT DOCUMENTS

JP    H05-292328 A    11/1993
JP    H07-99579 A    4/1995
(Continued)

OTHER PUBLICATIONS

Hudson et al., "JPEG-1 standard 25 years", JElectronicimaging.org 2018.*
(Continued)

*Primary Examiner* — Amir Alavi
(74) *Attorney, Agent, or Firm* — Oliff PLC

(57) ABSTRACT

A Huffman decoding unit includes: a code analysis unit configured to analyze compressed image data in encoded data sequentially received, and sequentially recognize zero run information, group number information, and additional bit information; and a frequency conversion unit configured to generate coefficient information based on the recognized zero run information, group number information and additional bit information. The code analysis unit receives the encoded data sequentially received and cutout information for cutting out a partial image from an entire image that is decodable based on the compressed image data. When the cutout information is received, only in a case where the compressed image data sequentially received is compressed image data intended for cutout, the code analysis unit
(Continued)

outputs, to the frequency conversion unit, the zero run information, the group number information, and the additional bit information, each of which is recognized by analyzing the compressed image data.

4 Claims, 11 Drawing Sheets

(58) Field of Classification Search
CPC ........... H04N 7/26244; H04N 7/26313; H04N 7/26335; H04N 7/26271; G06T 9/005
See application file for complete search history.

(56) References Cited

U.S. PATENT DOCUMENTS

| | | | | |
|---|---|---|---|---|
| 5,793,892 | A * | 8/1998 | Pan | H04N 19/503 348/390.1 |
| 6,041,144 | A * | 3/2000 | Sugiura | G06T 9/00 375/240.03 |
| 7,313,272 | B2 * | 12/2007 | Miyanohara | H04N 1/648 375/E7.185 |
| 8,249,339 | B2 * | 8/2012 | Tsuda | G06T 3/4007 382/166 |
| 8,433,151 | B2 * | 4/2013 | Yokose | H04N 19/60 382/251 |
| 8,437,560 | B2 * | 5/2013 | Wu | H04N 19/48 382/232 |
| 8,515,192 | B2 * | 8/2013 | Reese | H04N 19/436 382/234 |
| 8,600,766 | B2 * | 12/2013 | Kim | H04N 19/91 704/503 |
| 8,866,647 | B2 * | 10/2014 | Kataoka | H03M 7/40 341/65 |
| 2001/0021971 | A1 | 9/2001 | Gibson et al. | |
| 2005/0141748 | A1 * | 6/2005 | Inoue | G06T 1/0057 382/100 |
| 2015/0195553 | A1 * | 7/2015 | Tamatani | H04N 19/91 382/233 |

FOREIGN PATENT DOCUMENTS

| | | |
|---|---|---|
| JP | 2001-008040 A | 1/2001 |
| JP | 2005-348410 A | 12/2005 |
| JP | 2008-22376 A | 1/2008 |

OTHER PUBLICATIONS

Feb. 20, 2018 International Search Report issued in International Patent Application No. PCT/JP2018/000259.

* cited by examiner

IMAGE DECODING DEVICE FOR EXPANDING A PARTIAL IMAGE FROM AN ENTIRE IMAGE

TECHNICAL FIELD

The present invention relates to an image decoding device configured to decode image data (encoded data) compressed using a Huffman code.

BACKGROUND ART

Conventionally, in a field handling images such as photographs, an image encoding device and an image decoding device have been used. The image encoding device is configured to compress and encode image data, which is original data, in accordance with the JPEG (Joint Photographic Experts Group) standard in order to reduce a load or the like in communication. The image decoding device is configured to expand the encoded compressed image data to reconstruct the original image.

As shown in FIG. 8, an image encoding device 50 generally includes a DCT unit 60, a quantization unit 70, a zigzag scan unit 80, and a Huffman encoding unit 90. DCT unit 60 performs the following process: image data, converted from RGB color data to YUV luminance color difference data, is divided into blocks each having 8×8 pixels; and for each divided block, image data corresponding to each pixel is converted into a frequency component (referred to as DCT (Discrete Cosine Transform) coefficient) so as to generate coefficient data including one DC (Direct Current) coefficient and 63 AC (Alternating Current) coefficients.

Quantization unit 70 performs a quantization process by dividing each of the 8×8 coefficient data (numerical values), which have been generated for the respective blocks by DCT unit 60, by a corresponding numerical value in a quantization table (8×8 numerical values) prepared in advance. Zigzag scan unit 80 performs a process to generate 64 pieces of coefficient data arranged in a straight line (that is, arrayed one-dimensionally) by scanning the 8×8 pieces of coefficient data, which have been quantized by quantization unit 70 for each block, in a zigzag manner from the DC coefficient across the AC coefficients. Huffman encoding unit 90 performs a process to generate and output encoded data obtained by encoding, using a Huffman code, the coefficient data one-dimensionally arrayed by zigzag scan unit 80 for each block.

FIG. 9 shows a data structure of general encoded data (JPEG stream) generated by image encoding device 50. As shown in FIG. 9, this encoded data has a structure in which a front marker group, encoded compressed image data, and an EOI (End Of Image) marker are arranged sequentially. The front marker group is constituted of various types of markers. The EOI marker defines the end of the encoded data.

The front marker group includes: a SOI (Start Of Image) marker that defines the head of the encoded data; a DQT (Define Quantization Table) marker that defines the quantization table; a SOF (Start Of Frame) marker that defines the start of a frame and defines an image size; a DHT (Define Huffman Table) marker that defines the Huffman code table; and a SOS (Start Of Scan) marker that defines that compressed image data exists subsequent to the SOS marker.

Moreover, the compressed image data is represented by representing the coefficient data for each block by the Huffman code and variable length code. The Huffman code defines zero run information and group number information, and the variable length code is constituted of an additional bit representing a coefficient value. A RSTm (Restart marker) (marker) may be inserted at the end of the code for each block.

On the other hand, as shown in FIG. 10, image decoding device 100 includes a Huffman decoding unit 110, a reverse zigzag scan unit 120, an dequantization unit 130, and an IDCT unit 140 (see Patent Literature 1 described below). Generally, as shown in FIG. 11, Huffman decoding unit 110 includes a code input unit 111, an internal buffer 112, a front marker analysis unit 113, a final marker analysis unit 114, a code analysis unit 115, and a frequency conversion unit 116.

Code input unit 111 performs a process to receive the encoded data from outside and store it into internal buffer 112. Internal buffer 112 performs a process to send the received encoded data to each of front marker analysis unit 113, final marker analysis unit 114, and code analysis unit 115. Front marker analysis unit 113 performs a process to extract the front markers included in the encoded data and send the extracted front markers to reverse zigzag scan unit 120. Final marker analysis unit 114 performs a process to detect the EOI marker in the encoded data sent from internal buffer 112, and send a resulting detection signal to reverse zigzag scan unit 120.

Code analysis unit 115 performs a process to: recognize the Huffman code table based on the DHT marker sent from internal buffer 112; recognize the Huffman code by sequentially analyzing, for each block based on the Huffman code table, the compressed image data subsequent to the SOS marker sent from internal buffer 112; recognize the zero run information and group number information corresponding to the recognized Huffman code; recognize the additional bit in accordance with the additional bit length corresponding to the group number; and output them to frequency conversion unit 116. Based on the zero run information, group number information and additional bit sent from code analysis unit 115, frequency conversion unit 116 reconstructs, for each block, the one-dimensional array of quantized coefficient data, and sends it to reverse zigzag scan unit 120.

Thus, in this Huffman decoding unit 110, the marker information of the front marker group included in the encoded data is analyzed by marker analysis unit 113 and is sent to reverse zigzag scan unit 120. Then, the one-dimensional array of coefficient data is reconstructed from the compressed image data for each block by code analysis unit 115 and frequency conversion unit 116, and is sent to reverse zigzag scan unit 120. When the whole of the encoded data is processed and the EOI marker is detected by final marker analysis unit 114, the marker information of the EOI marker is sent from final marker analysis unit 114 to reverse zigzag scan unit 120.

Reverse zigzag scan unit 120 performs, onto the coefficient data decoded by Huffman decoding unit 110, a process reverse to the above-described zigzag scan, thereby performing a process to convert the one-dimensional array of coefficient data into an 8×8 two-dimensional array of coefficient data. Dequantization unit 130 performs a process to multiply each of the 8×8 coefficient data output and sent from reverse zigzag scan unit 120, by a corresponding numerical value of the quantization table defined by the DQT marker also sent from reverse zigzag scan unit 120, thereby converting it into dequantized coefficient data. IDCT (Inverse Discrete Cosine Transform) unit 140 performs a process to convert the coefficient data converted by dequantization unit 130, into 8×8-pixel YUV luminance color difference data. The YUV luminance color difference data is finally converted into RGB color data.

CITATION LIST

Patent Literature

PTL 1: Japanese Patent Laying-Open No. 7-99579

SUMMARY OF INVENTION

Technical Problem

When expanding the compressed image using image decoding device 100 described above, depending on a purpose of use by a user, it may be sufficient to expand only a required partial image, rather than the entire compressed image. For example, when a wide image is captured to include surroundings of a required image in order to prevent lacking in the image data, the user can obtain an intended image if an image in a required range of the entire captured image in consideration of a margin appropriately is expanded.

However, conventional image decoding device 100 described above is configured to only expand the entire compressed image data, and is therefore unable to cope with the above-described expansion of a partial image. Accordingly, even when the user needs a part of a compressed image, the entire image needs to be expanded. It takes time more than necessary to obtain an intended expanded image, disadvantageously.

The present invention has been made in view of the above circumstance, and has an object to provide an image decoding device that can expand an image in a range desired by a user.

Solution to Problem

To solve the above-described problem, the present invention is directed to an image decoding device at least including:

a Huffman decoding unit configured to decode encoded data including compressed image data compressed by a Huffman encoding process; and a reverse zigzag scan unit configured to convert, into a two-dimensional array of data, a one-dimensional array of data decoded by the Huffman decoding unit, wherein the encoded data has a structure in which a front marker group, the compressed image data, and an EOI marker defining an end of the encoded data are arranged sequentially, the front marker group at least includes a SOI marker that defines a head of the encoded data,
a DQT marker that defines a quantization table,
a SOF marker that defines a size of the compressed image data,
a DHT marker that defines a Huffman code table, and
a SOS marker that defines that the compressed image data exists subsequent to the SOS marker, the Huffman decoding unit includes a front marker analysis unit configured to analyze the encoded data sequentially received, extract each marker of the front marker group, and outputs each extracted marker to the reverse zigzag scan unit,
a final marker analysis unit configured to analyze the encoded data sequentially received, and output an end signal to the reverse zigzag scan unit when the EOI marker is detected, a code analysis unit configured to analyze the compressed image data in the encoded data sequentially received, and sequentially recognize and output zero run information, group number information, and additional bit information, and
a frequency conversion unit configured to sequentially generate coefficient information based on the zero run information, the group number information and the additional bit information each sequentially output from the code analysis unit, and output the coefficient information to the reverse zigzag scan unit, the code analysis unit is configured to receive the encoded data sequentially received and receive cutout information for cutting out a partial image from an entire image that is decodable based on the compressed image data, and when the cutout information is received, only in a case where the compressed image data sequentially received is compressed image data intended for cutout, the code analysis unit is configured to output, to the frequency conversion unit, the zero run information, the group number information, and the additional bit information, each of which is recognized by analyzing the compressed image data.

According to this image decoding device, the encoded data including the compressed image data is processed by the Huffman decoding unit. That is, the sequentially received encoded data is analyzed by the front marker analysis unit, the front marker is extracted, and the extracted front marker is output to the reverse zigzag scan unit.

Moreover, the front marker information is analyzed by the code analysis unit, the compressed image data is analyzed sequentially based on the analyzed Huffman code table to recognize the Huffman code, then the zero run information and group number information corresponding to the recognized Huffman code are recognized, the additional bit is recognized from the additional bit length corresponding to the group number, and the recognized zero run information, group number information, and additional bit information are sequentially sent to the frequency conversion unit.

In the frequency conversion unit, based on the zero run information, group number information, and additional bit information sequentially output from the code analysis unit, the one-dimensional array of quantized coefficient data (coefficient information, specifically, DCT coefficient data; the same applies to the description below) is reconstructed and sent to the reverse zigzag scan unit.

In this case, when the cutout information is received from outside, only in the case where the sequentially received compressed image data is compressed image data intended for cutout, the code analysis unit outputs, to the frequency conversion unit, the zero run information, the group number information, and the additional bit information, each of which is recognized by analyzing the compressed image data. The frequency conversion unit reconstructs the one-dimensional array of quantized coefficient data based on the zero run information, group number information, and additional bit information thus received and corresponding to only the compressed image data intended for cutout, and sends it to the reverse zigzag scan unit.

When the EOI marker indicating the end of the encoded data is received, the EOI marker is detected by the final marker analysis unit, and a resulting detection signal, i.e., a signal indicating that the process in the Huffman encoding unit has been ended, is output from the final marker analysis unit to the reverse zigzag scan unit.

In the reverse zigzag scan unit, the one-dimensional array of coefficient data output from the frequency conversion unit is converted into a two-dimensional array of coefficient data through a process reverse to the zigzag scan performed in the encoding process.

Thus, according to the image decoding device according to the present invention, when the user wishes to expand only a partial image of the compressed image, by externally providing the cutout information for specifying an image range for cutout, the process to reconstruct the coefficient data is performed only for the image intended for cutout in the Huffman decoding unit. In the reverse zigzag scan unit and subsequent processing units, data relating only to the image intended for cutout is processed.

Thus, according to the image decoding device according to the present invention, the user can decode only an image intended for cutout from a compressed image. Therefore, the user can obtain an intended expanded image in a shorter period of time than that in the conventional image decoding device configured to decode the entire compressed image.

Moreover, the image decoding device according to the present invention may further include a size count unit, wherein the size count unit is configured to receive the cutout information, receive the zero run information and the group number information each output from the code analysis unit, integrate a size of the image analyzed by the code analysis unit, and output a coincidence signal to the final marker analysis unit when the integrated size of the image coincides with a cutout image size obtained from the cutout information.

In this case, when the coincidence signal is received from the size count unit, the final marker analysis unit is configured to output the end signal to the reverse zigzag scan unit without waiting for the detection of the EOI marker.

According to the image decoding device thus configured, the size of the image processed by the code analysis unit is integrated by the size count unit based on the zero run information and group number information output from the code analysis unit. When the integrated image size coincides with the cutout image size, the coincidence signal is output to the final marker analysis unit. When the coincidence signal is received from the size count unit, the final marker analysis unit immediately outputs the end signal to the reverse zigzag scan unit. Thus, according to the image decoding device thus configured, when the reconstruction of the entire coefficient data relating to the image intended for cutout is ended and the coefficient data is sent from the frequency conversion unit to the reverse zigzag scan unit, the end signal is immediately sent from the final marker analysis unit to the reverse zigzag scan unit. Hence, the reverse zigzag scan unit can end its own process without waiting time, thereby further shortening the process time.

Moreover, in the image decoding device according to the present invention, in the case of a configuration in which the compressed image data has a restart maker arranged per data corresponding to a predetermined number of pixels, the following configuration can be employed:

the code analysis unit is constituted of a cutout signal generation unit and a code analysis execution unit, the cutout signal generation unit is configured to when the cutout information is received from outside, recognize the restart maker by analyzing the compressed image data in the encoded data sequentially received, recognize the number of pixels for the compressed image data sequentially received, by counting the number of recognized restart makers, generate and output a cutout start signal when a pixel corresponding to the received compressed image data coincides with a cutout start pixel defined by the cutout information, generate and output a cutout stop signal when compressed image data corresponding to a cutout image width defined by the cutout information is then received in a corresponding scan line, and then sequentially generate and output a cutout start signal and a cutout stop signal for each scan line corresponding to a cutout image height defined by the cutout information, and the code analysis execution unit is configured to analyze the compressed image data in the encoded data sequentially received and sequentially recognize and output the zero run information, the group number information, and the additional bit information, when a signal relating to the cutout is received from outside, perform the process to analyze the compressed image data after receiving the cutout start signal from the cutout signal generation unit, output the recognized zero run information, group number information, and additional bit information to the frequency conversion unit, and when the cutout stop signal is received from the cutout signal generation unit, stop the process to analyze the compressed image data, until the cutout start signal is then received.

In the image decoding device thus configured, in a normal case, the front marker information is analyzed by the code analysis execution unit, the compressed image data is analyzed sequentially based on the analyzed Huffman code table to recognize the Huffman code, then the zero run information and group number information corresponding to the recognized Huffman code are recognized, the additional bit is recognized from the additional bit length corresponding to the group number, and the recognized zero run information, group number information, and additional bit information are sequentially sent to the frequency conversion unit. In the frequency conversion unit, based on the zero run information, group number information, and additional bit information sequentially output from the code analysis execution unit, the one-dimensional array of quantized coefficient data is reconstructed and sent to the reverse zigzag scan unit.

On the other hand, when the cutout information is received from outside, the compressed image data in the sequentially received encoded data is analyzed by the cutout signal generation unit to recognize the restart makers included in the compressed image data. By counting the number of the recognized restart makers, the number of pixels corresponding to the received compressed image data is recognized.

Further, when the pixel relating to the received compressed image data coincides with the cutout start pixel defined by the cutout information, the cutout signal generation unit generates and outputs the cutout start signal. When the compressed image data corresponding to the cutout image width is received in a corresponding scan line, the cutout signal generation unit generates and outputs the cutout stop signal. Thereafter, the cutout signal generation unit sequentially generates and outputs the cutout start signal and the cutout stop signal for each scan line corresponding to the cutout image height.

Moreover, when the signal relating to the cutout is received from outside, the code analysis execution unit performs the process to analyze the compressed image data after receiving the cutout start signal from the cutout signal generation unit, and outputs the recognized zero run information, group number information, and additional bit information to the frequency conversion unit. When the cutout stop signal is received from the cutout signal generation unit, the code analysis execution unit stops the process to analyze the compressed image data, until the cutout start signal is then received. The sequentially received compressed image data may be skipped, for example.

Thus, also according to the image decoding device thus configured, when the user wishes to expand only a partial image of a compressed image, by externally providing the cutout information for specifying an image range for cutout, the process to reconstruct the coefficient data is performed only for the image intended for cutout in the Huffman decoding unit. In the reverse zigzag scan unit and subsequent processing units, data relating only to the image intended for cutout is processed. Therefore, the user can decode only the desired image intended for cutout from the compressed image, whereby an intended expanded image can be obtained in a shorter period of time than that in the case of the conventional image decoding device configured to decode the entire compressed image.

Moreover, the image decoding device thus configured may further include a size count unit, wherein the size count unit is configured to receive the cutout information, receive the zero run information and the group number information each output from the code analysis execution unit, integrate a size of the image analyzed by the code analysis unit, and output a coincidence signal to the final marker analysis unit when the integrated size of the image coincides with a cutout image size obtained from the cutout information.

In this case, when the coincidence signal is received from the size count unit, the final marker analysis unit is configured to output the end signal to the reverse zigzag scan unit without waiting for the detection of the EOI marker.

According to the image decoding device thus configured, the size of the image processed by the code analysis execution unit is integrated by the size count unit based on the zero run information and group number information output from the code analysis execution unit. When the integrated image size coincides with the cutout image size, the coincidence signal is output to the final marker analysis unit. When the coincidence signal is received from the size count unit, the final marker analysis unit immediately outputs the end signal to the reverse zigzag scan unit. Thus, according to the image decoding device thus configured, when the reconstruction of the entire coefficient data relating to the image intended for cutout is ended and the coefficient data is sent from the frequency conversion unit to the reverse zigzag scan unit, the end signal is immediately sent from the final marker analysis unit to the reverse zigzag scan unit. Hence, the reverse zigzag scan unit can end its own process without waiting time, thereby further shortening the process time.

Advantageous Effects of Invention

As described above, according to the present invention, when the user wishes to expand only a partial image of the compressed image, by externally providing the cutout information for specifying an image range for cutout, the process to reconstruct the coefficient data is performed only for the image intended for cutout in the Huffman decoding unit. In the reverse zigzag scan unit and subsequent processing units, data relating only to the image intended for cutout is processed. Thus, the user can decode only the desired image intended for cutout from the compressed image, whereby an intended expanded image can be obtained in a shorter period of time than that in the case of the conventional image decoding device configured to decode the entire compressed image.

DESCRIPTION OF EMBODIMENTS

Figure 1:
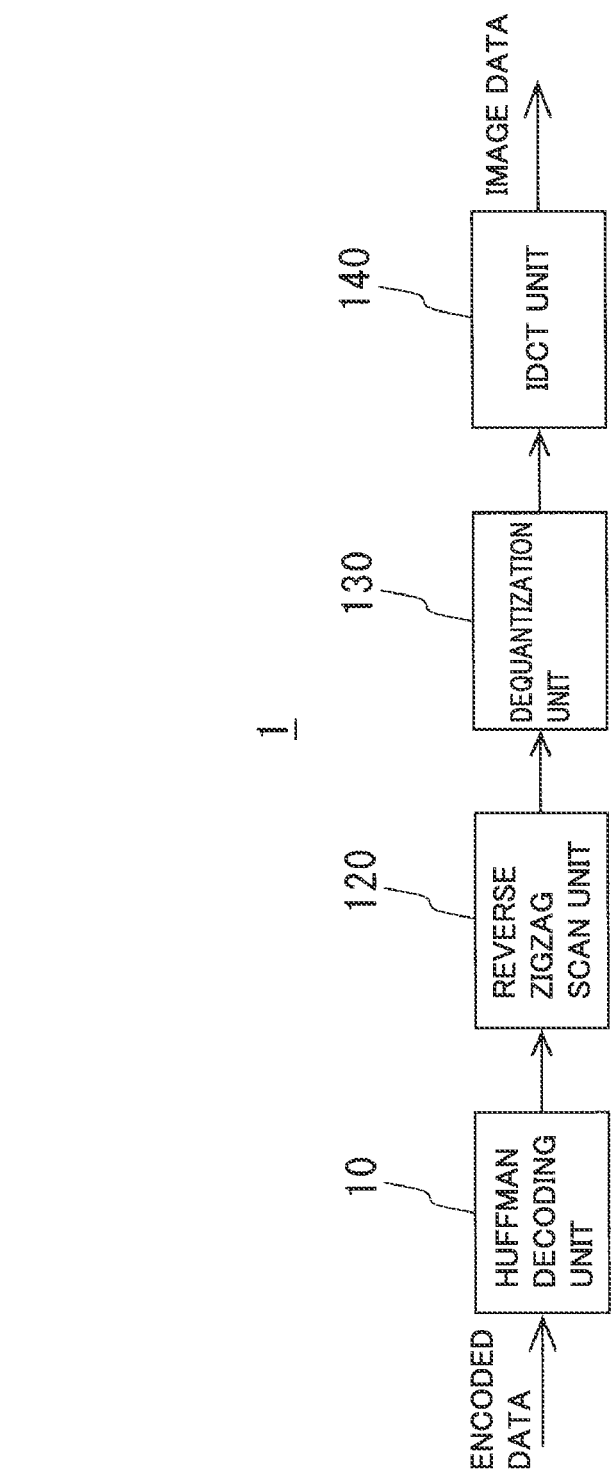
FIG. 1 is a block diagram showing a schematic configuration of an image decoding device according to a specific embodiment of the present invention.
Figure 10:
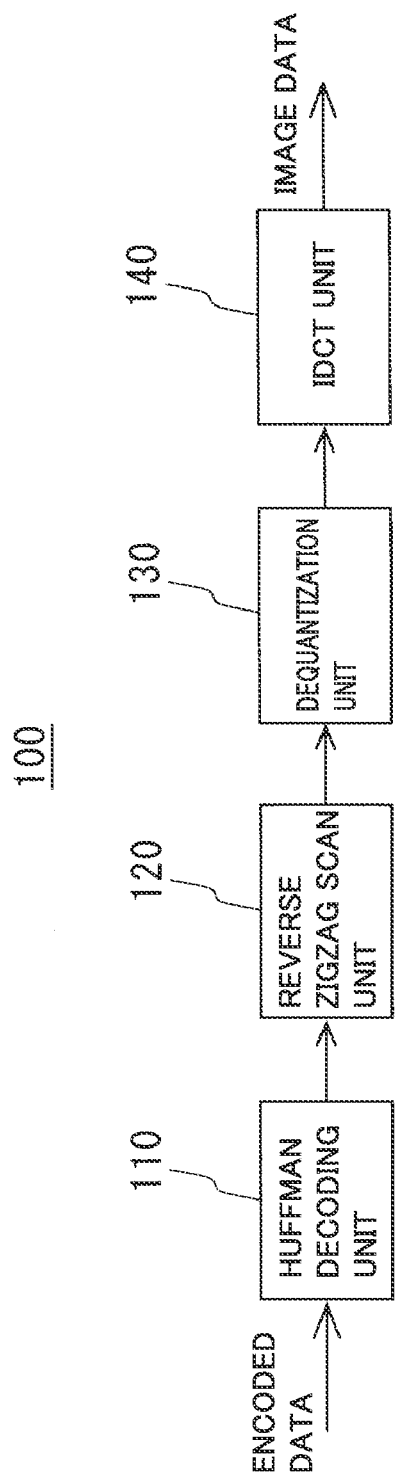
FIG. 10 is a block diagram showing a schematic configuration of a conventional image decoding device.
Figure 11:
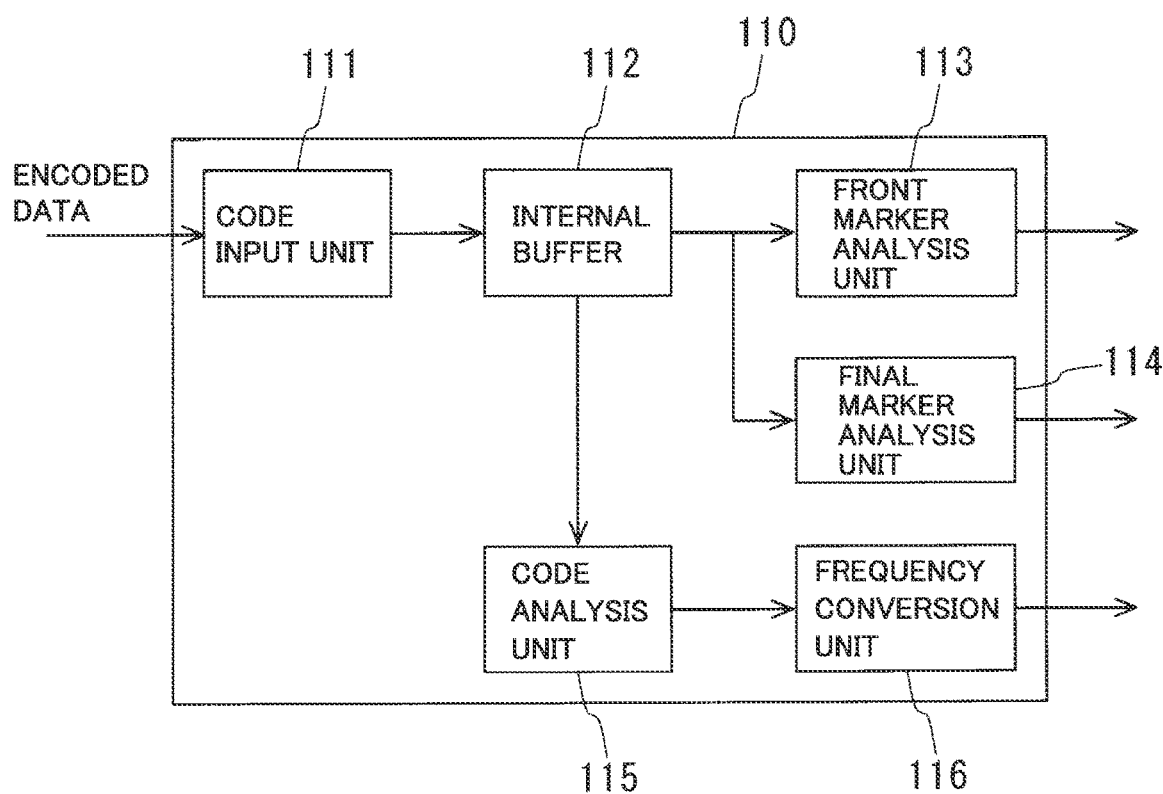
FIG. 11 is a block diagram showing a configuration of a conventional Huffman decoding unit.

The following describes specific embodiments of the present invention with reference to figures. FIG. 1 is a block diagram showing a schematic configuration of an image decoding device according to the present embodiment. As shown in FIG. 1, image decoding device 1 according to the present example is different from the above-described conventional image decoding device 100 shown in FIG. 10 only in the configuration of Huffman decoding unit 10. Reverse zigzag scan unit 120, dequantization unit 130, and IDCT unit 140 are the same as those of conventional image decoding device 100. Therefore, the same components are given the same reference characters in FIG. 1 and are not described below in detail.

Figure 9:
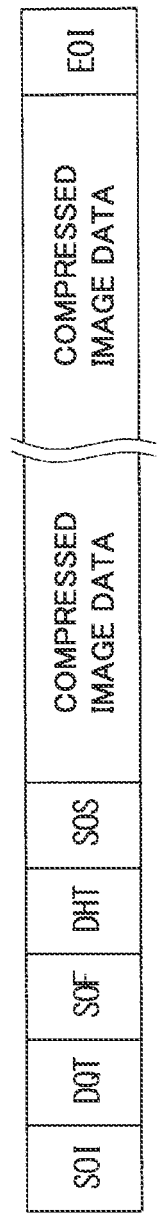
FIG. 9 is an explanatory diagram showing a structure of encoded data generated by the image encoding device.

Moreover, encoded data (JPEG stream) handled in the present example has the same data structure as that of the encoded data shown in FIG. 9. Further, in the compressed image data, a RSTm marker is arranged per data corresponding to a predetermined number of pixels (8×8 pixels as a unit block). In the front marker group, a DRI (Define Restart Interval) marker is arranged to define a pixel interval at which the RSTm markers are arranged.

Figure 2:
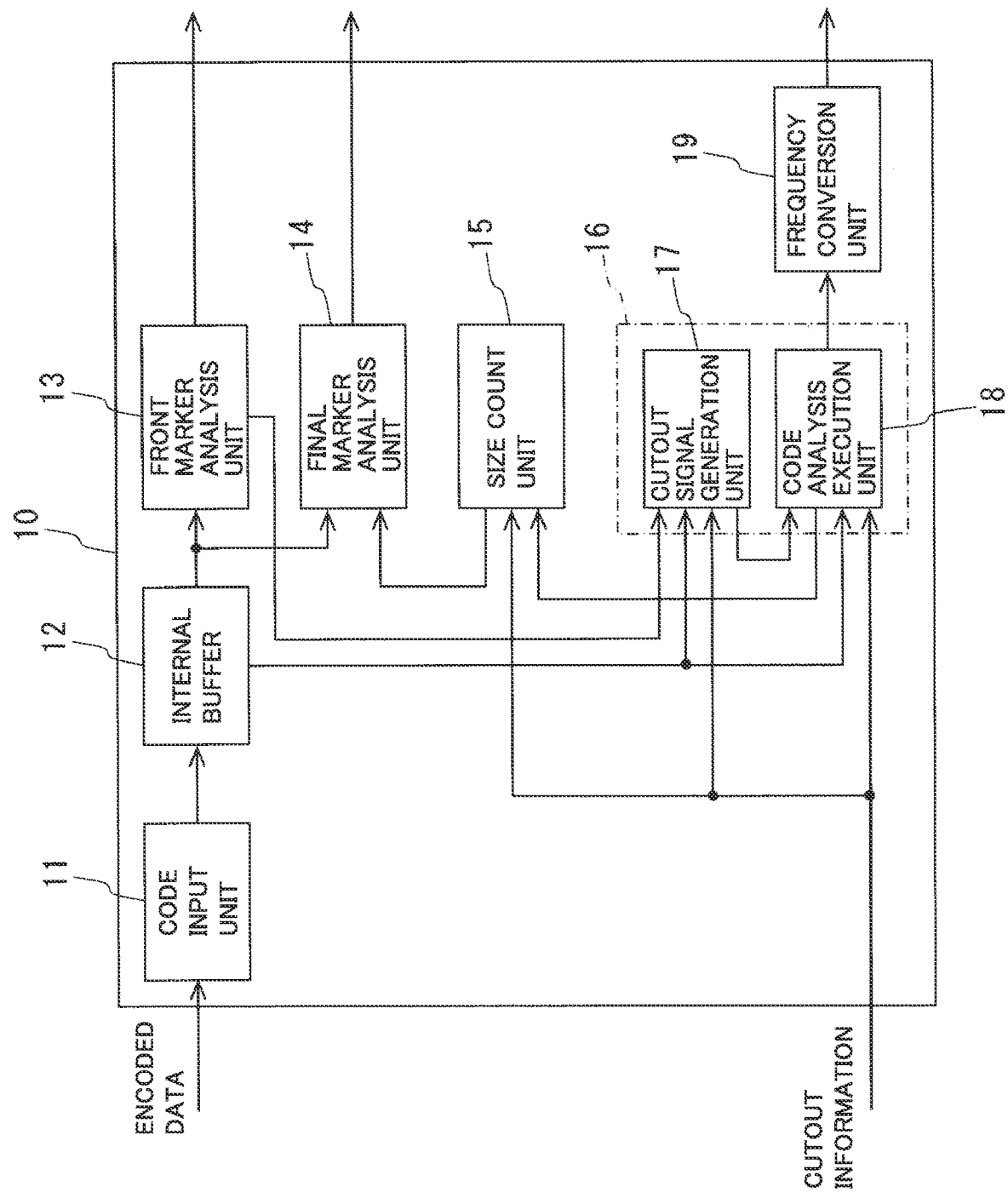
FIG. 2 is a block diagram showing a configuration of a Huffman decoding unit according to the present embodiment.

As shown in FIG. 2, Huffman decoding unit 10 of the present example is constituted of a code input unit 11, an internal buffer 12, a front marker analysis unit 13, a final marker analysis unit 14, a size count unit 15, a code analysis unit 16, and a frequency conversion unit 19.

Code input unit 11 performs a process to receive the encoded data from outside, and store the encoded data into internal buffer 12. Internal buffer 12 performs a process to send the received encoded data to each of front marker analysis unit 13, final marker analysis unit 14, and code analysis unit 16.

Front marker analysis unit 13 performs a process to extract the front markers included in the encoded data and output the extracted front markers to reverse zigzag scan unit 120.

Figure 5:
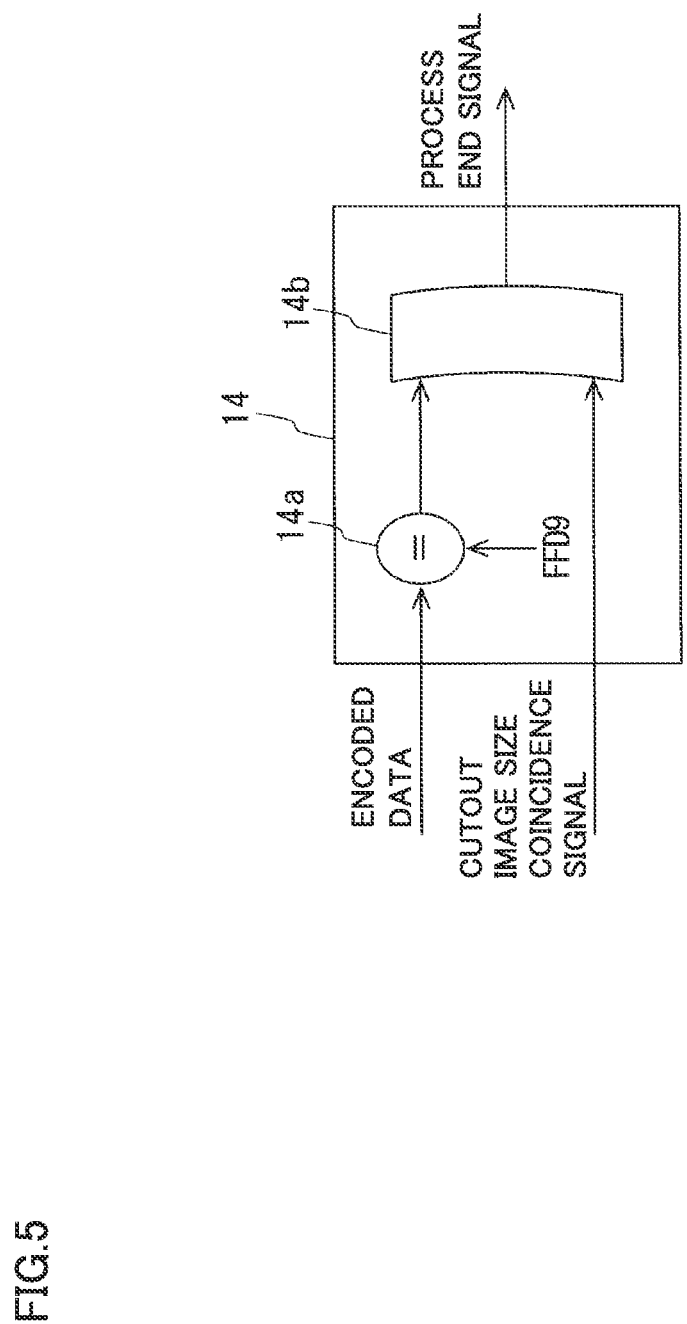
FIG. 5 is a block diagram showing a configuration of a final marker analysis unit according to the present embodiment.

Final marker analysis unit 14 is constituted of a coincidence circuit 14a and an OR circuit 14b as shown in FIG. 5. Coincidence circuit 14a is a circuit configured to receive the encoded data from internal buffer 12 and detect the EOI marker (FFD 9). When the EOI marker is detected, coincidence circuit 14a outputs a detection signal to OR circuit 14b. Moreover, when the signal is received from coincidence circuit 14a or when a cutout image size coincidence signal, which will be described specifically later, is received from size count unit 15, OR circuit 14b performs a process to output a process end signal to reverse zigzag scan unit 120.

Thus, when the EOI marker is detected from the encoded data sent from internal buffer 12 or when the cutout image size coincidence signal is received from size count unit 15, final marker analysis unit 14 outputs the process end signal to reverse zigzag scan unit 120.

Figure 3:
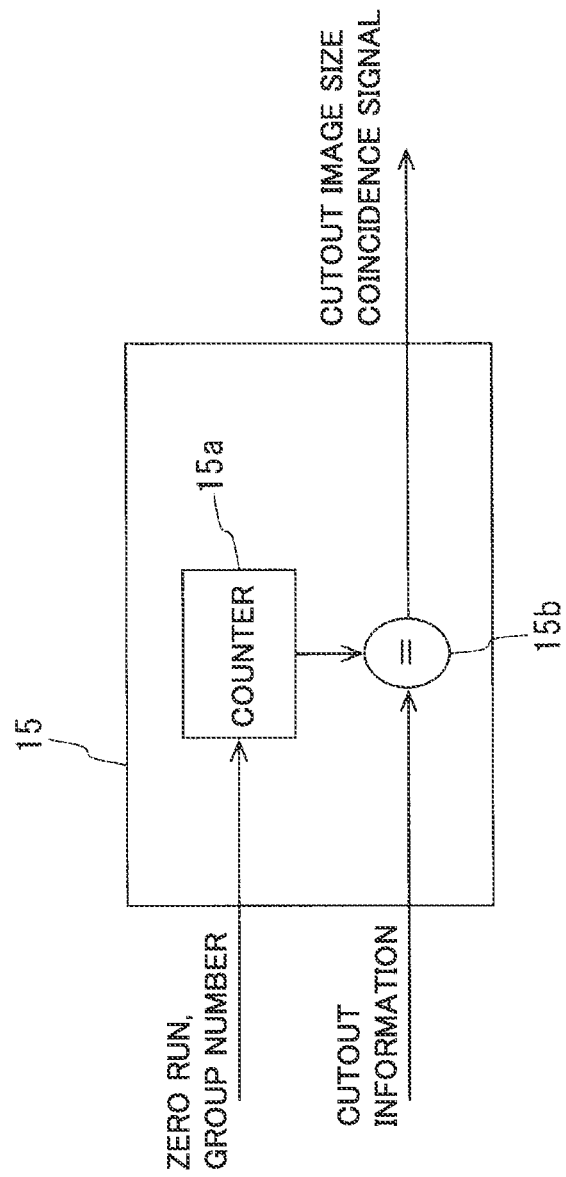
FIG. 3 is a block diagram showing a configuration of a size count unit according to the present embodiment.

Size count unit 15 is constituted of a counter 15a and a coincidence circuit 15b as shown in FIG. 3. Counter 15a performs a process to: sequentially receive zero run information and group number information sent from a code analysis execution unit 18 specifically described later; integrate the size of the image processed by the code analysis execution unit 18, based on the zero run information and the group number information; and output it to coincidence circuit 15b.

On the other hand, coincidence circuit 15b receives, from outside, cutout image size information serving as cutout information. When the image size received from counter 15a and processed by code analysis execution unit 18 coincides with the cutout image size, the cutout image size coincidence signal is sent to final marker analysis unit 14.

It should be noted that the cutout information received from outside includes: a cutout start pixel position (upper left pixel position in the block as a unit); a cutout image width (number of pixels set for the block as a unit in the width direction); and a cutout image height (number of pixels set for the block as a unit in the height direction). The cutout image size is obtained by multiplying the cutout image width by the cutout image height.

Figure 4:
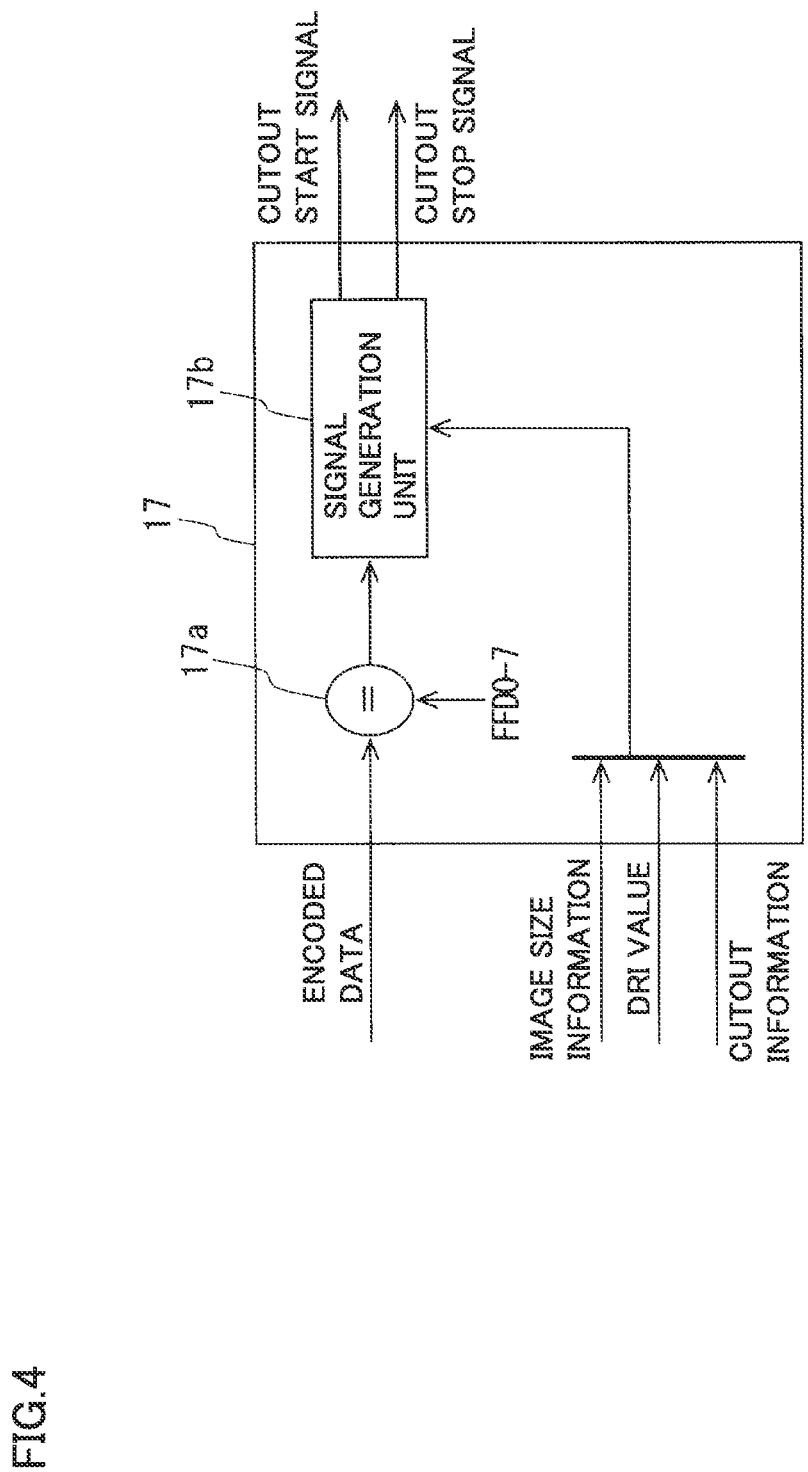
FIG. 4 is a block diagram showing a configuration of a cutout signal generation unit according to the present embodiment.

As shown in FIG. 2, code analysis unit 16 is constituted of a cutout signal generation unit 17 and a code analysis execution unit 18. Further, cutout signal generation unit 17 is constituted of a coincidence circuit 17a and a signal generation unit 17b as shown in FIG. 4.

Cutout signal generation unit 17 is configured to receive the cutout information from outside, and is also configured to receive, from front marker analysis unit 13, a DRI value defined by the DRI marker (pixel interval at which the RSTm markers are arranged) and image size information defined by the SOF marker in the marker information analyzed by front marker analysis unit 13. It should be noted that in the present example, the DRI value is for 64 pixels corresponding to the 8×8 pixels, which serve as one block as described above.

Coincidence circuit 17a analyzes the encoded data received from internal buffer 12, and detects a RSTm marker (FFD0-7). When the RSTm marker is detected, coincidence circuit 17a outputs a detection signal to signal generation unit 17b.

On the other hand, signal generation unit 17b recognizes the size of the entire image in accordance with the image size information received from front marker analysis unit 13, recognizes, in accordance with the DRI value, the pixel interval at which the RSTm markers are inserted, and recognizes the cutout start pixel position, the cutout image width, and the cutout image height in accordance with the cutout information received from outside.

Based on these pieces of information, signal generation unit 17b recognizes: the number (R1) of RSTm markers existing in a range from the first pixel position to the cutout start pixel position in the compressed image data to be processed based on a block as a unit in the scanning direction; the number (R2) of RSTm markers corresponding to the cutout image width; the number (R3) of RSTm markers corresponding to the number of pixels obtained by adding, to the number of remaining pixels other than the cutout image width in the corresponding scan line, the number of pixels up to the pixel at the cutout start position in the next scan line; and the number L of scan lines for the cutout image.

Figure 6:
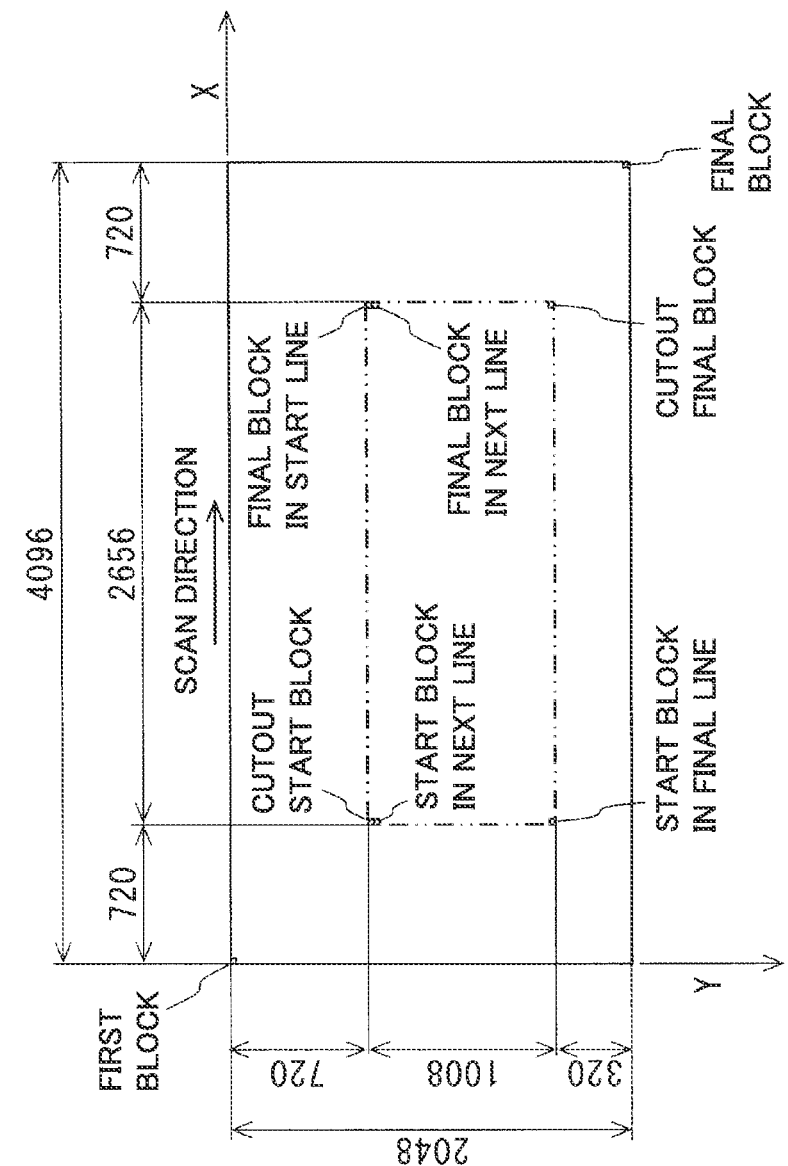
FIG. 6 is an explanatory diagram for illustrating a process in the cutout signal generation unit according to the present embodiment.

For example, as shown in FIG. 6, when the number of pixels of the entire image is 4096 pixels (X direction)×2048 pixels (Y direction), the cutout start pixel position of the cutout image is represented by X=720-th pixel and Y=720-th pixel, the cutout image width (X direction) is of 2656 pixels, and the cutout image height (Y direction) is of 1008 pixels, R1, R2, R3, and L satisfy the following formulas:

$$R1=(4096\times 720/64)+(720/8)=46170$$

$$R2=2656/8=332$$

$$R3=(720+720)/8=180$$

$$L=1008/8=126.$$

Signal generation unit 17b counts the number of detection signals output from coincidence circuit 17a. When the number of the outputs coincides with R1, i.e., when the pixel position of the compressed image data received from internal buffer 12 corresponds to the pixel position at which the cutout is started, signal generation unit 17b outputs a cutout start signal. Next, when the number of the outputs coincides with (R1+R2), i.e., when the input pixel position corresponds to the final pixel of the cutout image width in the corresponding scan line, signal generation unit 17b outputs a cutout stop signal.

Next, when the number of the outputs becomes (R1+R2+R3), i.e., when the input pixel position corresponds to the cutout start pixel position in the next scan line, signal generation unit 17b outputs a cutout start signal. When the number of the outputs coincides with (R1+2×R2+R3), i.e., when the input pixel position corresponds to the final pixel of the cutout image width in the corresponding scan line, signal generation unit 17b outputs a cutout stop signal.

Thereafter, signal generation unit 17b outputs the cutout start signal and the cutout stop signal in the same manner with respect to each scan line for the cutout image. After outputting the final cutout stop signal, signal generation unit 17b ends the process.

It should be noted that signal generation unit 17b is configured to perform the above-described process only when the cutout information is received from outside. The process can be summarized as follows. That is, assume that the number of the outputs of the detection signals from coincidence circuit 17a is represented by N and i represents an integer of 0 to L. When N=R1+(i−1)×R2+(i−1)×R3, i.e., when the input pixel position corresponds to the cutout start pixel position in the i-th scan line for the cutout image, signal generation unit 17b outputs a cutout start signal. When N=R1+i×R2+(i−1)×R3, i.e., when the input pixel position corresponds to the final pixel of the cutout image width in the i-th scan line for the cutout image, signal generation unit 17b outputs a cutout stop signal.

It should be noted that L represents the number of scan lines for the cutout image.

Code analysis execution unit 18 performs a process to: recognize the Huffman code table based on the DHT marker in the encoded data sequentially sent from internal buffer 12; sequentially recognize the Huffman code in the compressed image data by sequentially analyzing, for each block based on the Huffman code table, the compressed image data subsequent to the SOS marker in the encoded data; recognize the zero run information and group number information corresponding to the recognized Huffman code; recognize the additional bit based on the additional bit length corresponding to the group number; and output them to frequency conversion unit 19.

In this case, when the cutout information (signal relating to the cutout) is received from outside, code analysis execution unit 18 is configured to perform a process to analyze the compressed image data after receiving the cutout start signal from cutout signal generation unit 17, and output the recognized zero run information, group number information, and additional bit information to frequency conversion unit 19. When the cutout stop signal is received from cutout signal generation unit 17, code analysis execution unit 18 is configured to stop the process to analyze the compressed image data, until the cutout start signal is then received, and is configured to discard the compressed image data sent from internal buffer 12 during the stop of the process.

Moreover, frequency conversion unit 19 performs a process to reconstruct, for each block, the one-dimensional array of quantized coefficient data (specifically, the DCT coefficient data; the same applies to the description below) based on the zero run information, group number information, and additional bit sent from code analysis execution unit 18, and output it to reverse zigzag scan unit 120.

In Huffman decoding unit 10 of image decoding device 1 configured as described above in the present example, the encoded data received from outside is stored into internal buffer unit 12 by code input unit 11. The encoded data stored in internal buffer 12 is sequentially sent to each of front marker analysis unit 13, final marker analysis unit 14, cutout signal generation unit 17, and code analysis execution unit 18.

In front marker analysis unit 13, the front marker included in the encoded data is extracted, and the extracted front marker is sent to reverse zigzag scan unit 120.

Moreover, in a normal case in which no cutout information is received, in code analysis execution unit 18, the Huffman code table is recognized based on the DHT marker in the encoded data sequentially sent from internal buffer 12, then the received compressed image data subsequent to the SOS marker is sequentially analyzed for each block based on the Huffman code table, and the Huffman code in the compressed image data is recognized sequentially. The zero run information and group number information corresponding to the Huffman code are recognized, and the additional bit is recognized in accordance with the additional bit length corresponding to the group number. They are output to frequency conversion unit 19.

Frequency conversion unit 19 reconstructs the one-dimensional array of quantized coefficient data for each block based on the zero run information, group number information, and additional bit sent from code analysis execution unit 18, and sends it to reverse zigzag scan unit 120.

When the whole of the encoded data output from internal buffer 12 is processed and the EOI marker is detected by final marker analysis unit 14, the process end signal is sent from final marker analysis unit 14 to reverse zigzag scan unit 120. By receiving the end signal, reverse zigzag scan unit 120 recognizes that the whole of the encoded data has been processed in Huffman decoding unit 10.

On the other hand, when the cutout information is received from outside, the compressed image data in the encoded data sequentially received from internal buffer 12 is first analyzed by cutout signal generation unit 17 to detect the RSTm markers included in the compressed image data. When it is recognized, in accordance with the number of times of detection of the RSTm markers, that the pixel position of the compressed image data received from internal buffer 12 corresponds to the pixel position at which cutout is started in each scan line, the cutout start signal is sent from cutout signal generation unit 17 to code analysis execution unit 18. When it is recognized that the input pixel position corresponds to the final pixel of the cutout image width, the cutout stop signal is sent from cutout signal generation unit 17 to code analysis execution unit 18.

When the cutout information is received from outside, code analysis execution unit 18 performs a process to start analysis of the compressed image data received after receiving the cutout start signal from cutout signal generation unit 17, and output the recognized zero run information, group number information, and additional bit information to frequency conversion unit 19. When the cutout stop signal is received from cutout signal generation unit 17, code analysis execution unit 18 performs a process to: stop the process to analyze the compressed image data, until the cutout start signal is then received; and skip the compressed image data sent from internal buffer 12 during the stop of the process.

Moreover, in size count unit 15, based on the zero run information and group number information sent from code analysis execution unit 18, the image size processed by code analysis execution unit 18 is integrated. When the processed image size coincides with the cutout image size, the cutout image size coincidence signal is sent from size count unit 15 to final marker analysis unit 14. In response to reception thereof, the process end signal is sent from final marker analysis unit 14 to reverse zigzag scan unit 120.

Thus, according to image decoding device 1 of the present example, when the user wishes to expand only a partial image of the compressed image, by externally providing the cutout information for specifying an image range for cutout, the process to reconstruct the coefficient data is performed only for the image intended for cutout in Huffman decoding unit 10. In reverse zigzag scan unit 120 and subsequent processing units, data relating only to the image intended for cutout is processed. Therefore, the user can decode only the desired image intended for cutout from the compressed image, whereby an intended expanded image can be obtained in a shorter period of time than that in the case of conventional image decoding device 100 configured to decode the entire compressed image.

Moreover, in this image decoding device 1, the size of the image processed by code analysis execution unit 18 is integrated by size count unit 15. When the integrated image size coincides with the cutout image size, the coincidence signal is sent to final marker analysis unit 14 and the process end signal is immediately output from final marker analysis unit 14 to reverse zigzag scan unit 120. Hence, reverse zigzag scan unit 120 ends its process without waiting time, thereby shortening the process time.

Although the specific embodiments of the present invention have been described above, the embodiments of the present invention are not limited to these at all.

For example, in the example described above, size count unit 15 is provided. When the size of the image processed by code analysis execution unit 18 coincides with the cutout image size, the process end signal is immediately sent from final marker analysis unit 14 to reverse zigzag scan unit 120. However, the configuration is not limited to this. No size count unit 15 may be provided. In this case, waiting time is resulted in reverse zigzag scan unit 120; however, only the image data intended for cutout is processed in reverse zigzag scan unit 120 and subsequent units, i.e., an amount of data to be processed is reduced. Accordingly, the process time in each unit can be shortened, whereby the process time as a whole in image decoding device 1 can be shortened.

Figure 7A:
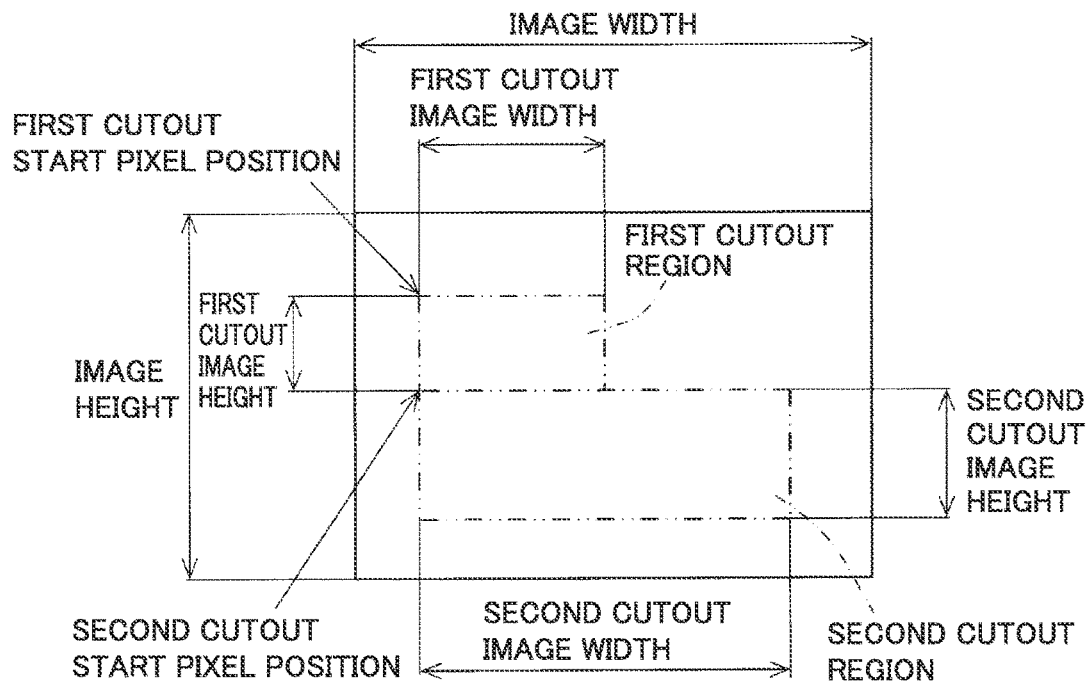
FIG. 7(A) and FIG. 7(B) are explanatory diagram for illustrating a manner in which the image decoding device according to the present embodiment can cut out.
Figure 7B:
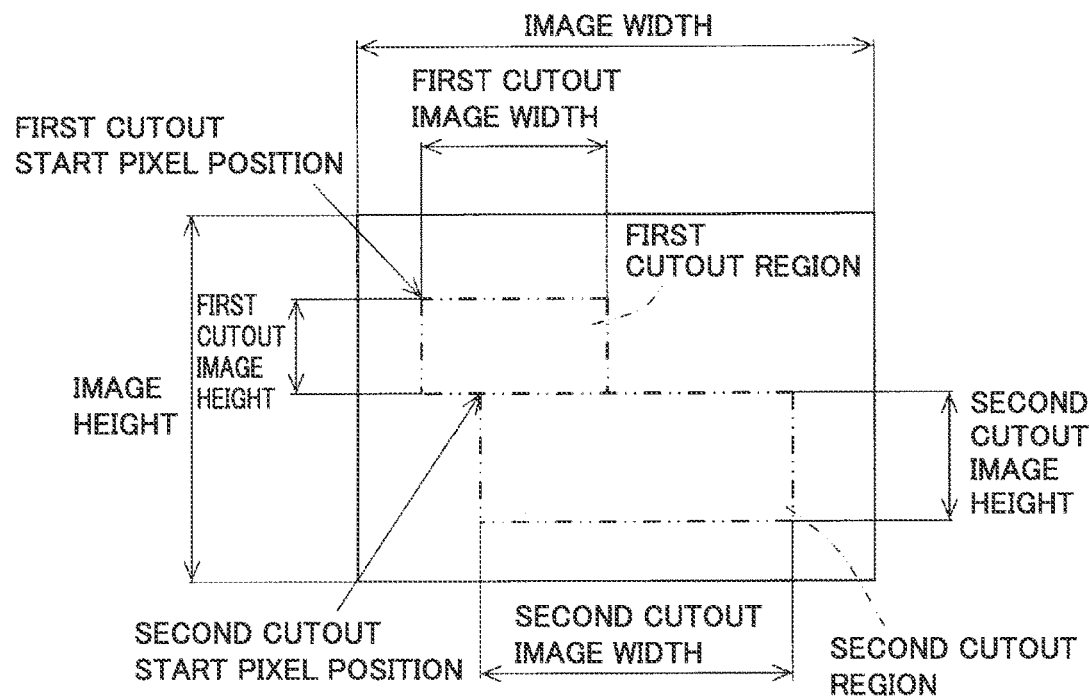
Figure 8:
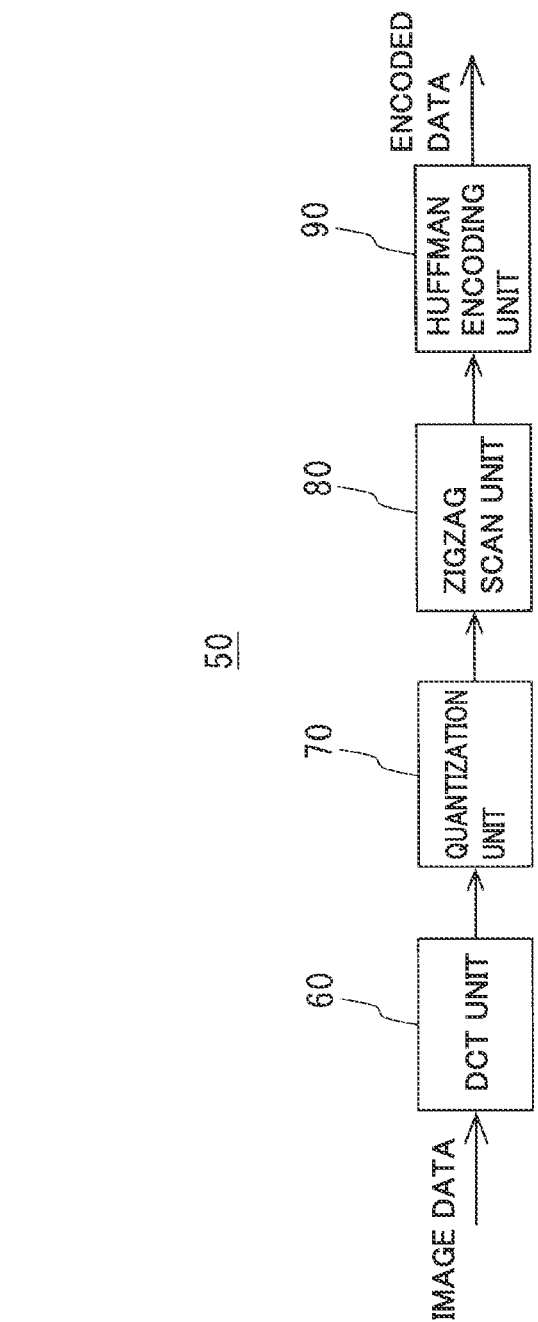
FIG. 8 is a block diagram showing a schematic configuration of a conventional image encoding device.

Moreover, in the example above, the image intended for cutout is one rectangular image; however, the configuration is not limited to this. The image intended for cutout may be set as an image having a plurality of rectangular regions. One example thereof is shown in FIGS. 7(A) and (B). In each of FIG. 7(A) and FIG. 7(B), two rectangular regions are intended for cutout. In this case, the cutout information includes: a first cutout start pixel position, a first cutout image width, and a first cutout height for a first cutout region; and a second cutout start pixel position, a second cutout image width, and a second cutout height for a second cutout region. In cutout signal generation unit 17, cutout start signals and cutout stop signals are generated for each of the first cutout region and the second cutout region. Further, the plurality of regions may be regions separated from each other.

REFERENCE SIGNS LIST

1: image decoding device
10: Huffman decoding unit
11: code input unit
12: internal buffer
13: front marker analysis unit
14: final marker analysis unit
15: size count unit
16: code analysis unit
17: cutout signal generation unit
18: code analysis execution unit
19: frequency conversion unit
120: reverse zigzag scan unit
130: dequantization unit
140: IDCT unit

The invention claimed is:

1. An image decoding device at least comprising:
a Huffman decoding unit configured to decode encoded data including compressed image data compressed by a Huffman encoding process; and
a reverse zigzag scan unit configured to convert, into a two-dimensional array of data, a one-dimensional array of data decoded by the Huffman decoding unit, wherein the encoded data has a structure in which a front marker group, the compressed image data, and an EOI marker defining an end of the encoded data are arranged sequentially,
the front marker group at least includes:
a SOI marker that defines a head of the encoded data;
a DQT marker that defines a quantization table;
a SOF marker that defines a size of the compressed image data;
a DHT marker that defines a Huffman code table; and
a SOS marker that defines that the compressed image data exists subsequent to the SOS marker,
the Huffman decoding unit includes:
a front marker analysis unit configured to analyze the encoded data sequentially received, extract each marker of the front marker group, and outputs each extracted marker to the reverse zigzag scan unit;
a final marker analysis unit configured to analyze the encoded data sequentially received, and output an end signal to the reverse zigzag scan unit when the EOI marker is detected;
a code analysis unit configured to analyze the compressed image data in the encoded data sequentially received, and sequentially recognize and output zero run information, group number information, and additional bit information; and
a frequency conversion unit configured to sequentially generate coefficient information based on the zero run information, the group number information and the additional bit information each sequentially output from the code analysis unit, and output the coefficient information to the reverse zigzag scan unit,
the code analysis unit is configured to receive the encoded data sequentially received and receive cutout information for cutting out a partial image from an entire image that is decodable based on the compressed image data, and
when the cutout information is received, only in a case where the compressed image data sequentially received is compressed image data intended for cutout, the code analysis unit is configured to output, to the frequency conversion unit, the zero run information, the group number information, and the additional bit information, each of which is recognized by analyzing the compressed image data.

2. The image decoding device according to claim 1, further comprising a size count unit, wherein
the size count unit is configured to:
receive the cutout information;
receive the zero run information and the group number information each output from the code analysis unit;
integrate a size of the image analyzed by the code analysis unit; and
output a coincidence signal to the final marker analysis unit when the integrated size of the image coincides with a cutout image size obtained from the cutout information, and
when the coincidence signal is received from the size count unit, the final marker analysis unit is configured to output the end signal to the reverse zigzag scan unit without waiting for the detection of the EOI marker.

3. The image decoding device according to claim 1, wherein
the compressed image data has a restart maker arranged per data corresponding to a predetermined number of pixels, the code analysis unit includes a cutout signal generation unit and a code analysis execution unit, the cutout signal generation unit is configured to:
  when the cutout information is received from outside, recognize the restart maker by analyzing the compressed image data in the encoded data sequentially received;
  recognize the number of pixels for the compressed image data sequentially received, by counting the number of recognized restart markers;
  generate and output a cutout start signal when a pixel for the received compressed image data coincides with a cutout start pixel defined by the cutout information;
  generate and output a cutout stop signal when compressed image data corresponding to a cutout image width defined by the cutout information is then received in a corresponding scan line; and
  then sequentially generate and output a cutout start signal and a cutout stop signal for each scan line corresponding to a cutout image height defined by the cutout information, and the code analysis execution unit is configured to:
  analyze the compressed image data in the encoded data sequentially received and sequentially recognize and output the zero run information, the group number information, and the additional bit information;
  when a signal relating to the cutout is received from outside, perform the process to analyze the compressed image data after receiving the cutout start signal from the cutout signal generation unit;
  output the recognized zero run information, group number information, and additional bit information to the frequency conversion unit; and
  when the cutout stop signal is received from the cutout signal generation unit, stop the process to analyze the compressed image data, until the cutout start signal is then received.

4. The image decoding device according to claim 3, further comprising a size count unit, wherein
  the size count unit is configured to:
    receive the cutout information;
    receive the zero run information and the group number information each output from the code analysis execution unit;
    integrate a size of the image analyzed by the code analysis unit; and
    output a coincidence signal to the final marker analysis unit when the integrated size of the image coincides with a cutout image size obtained from the cutout information, and
  when the coincidence signal is received from the size count unit, the final marker analysis unit is configured to output the end signal to the reverse zigzag scan unit without waiting for the detection of the EOI marker.

* * * * *